Dec. 9, 1941.　　　H. D. STEVENS　　　2,265,749
PRESSING APPARATUS
Filed Oct. 19, 1939　　　4 Sheets-Sheet 1

INVENTOR
Horace D. Stevens
BY
Ely & Frye
ATTORNEYS

Dec. 9, 1941.   H. D. STEVENS   2,265,749
PRESSING APPARATUS
Filed Oct. 19, 1939   4 Sheets-Sheet 2
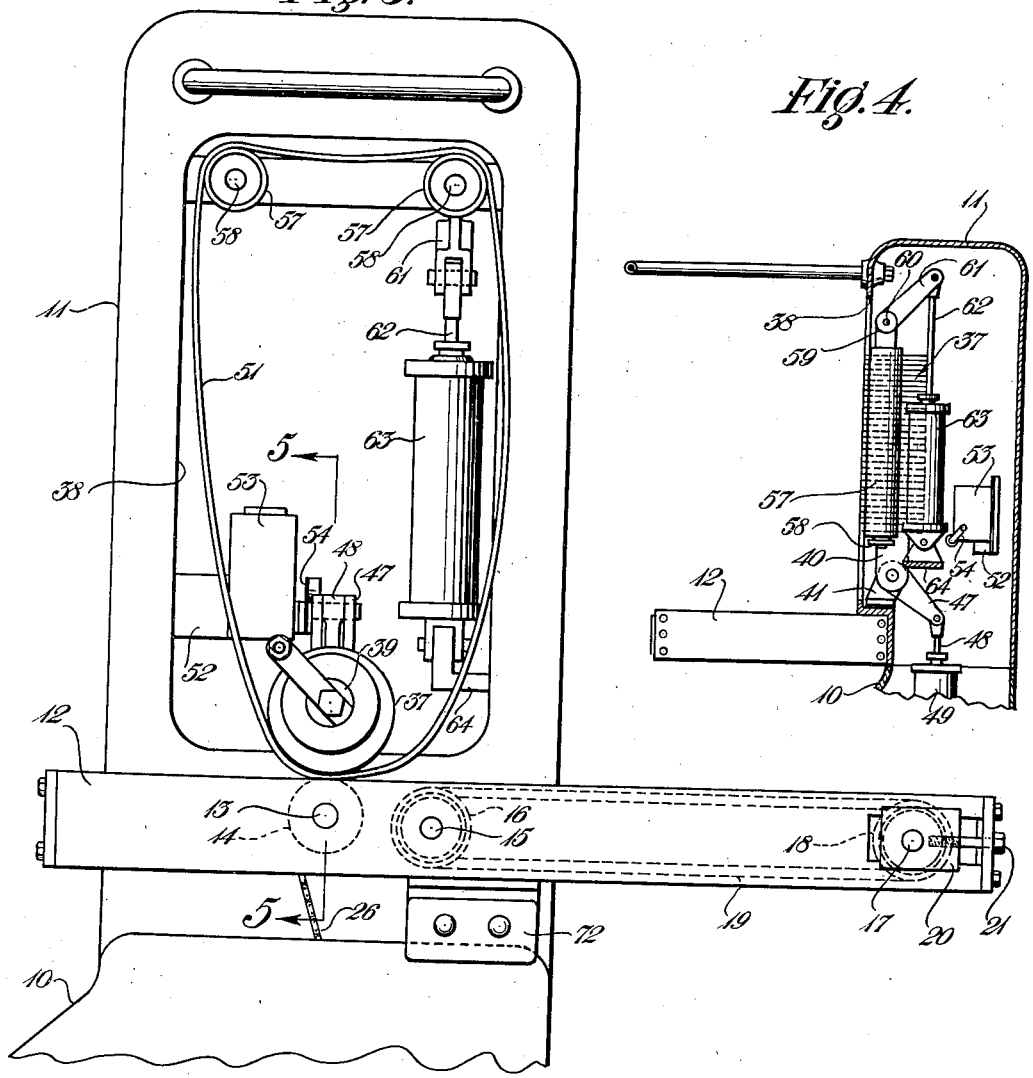
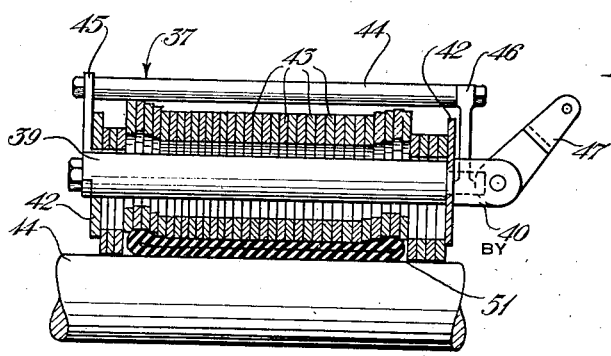
INVENTOR
Horace D. Stevens
BY
ATTORNEYS Dec. 9, 1941.  H. D. STEVENS  2,265,749
PRESSING APPARATUS
Filed Oct. 19, 1939   4 Sheets-Sheet 3

INVENTOR
Horace D. Stevens
BY
ATTORNEYS

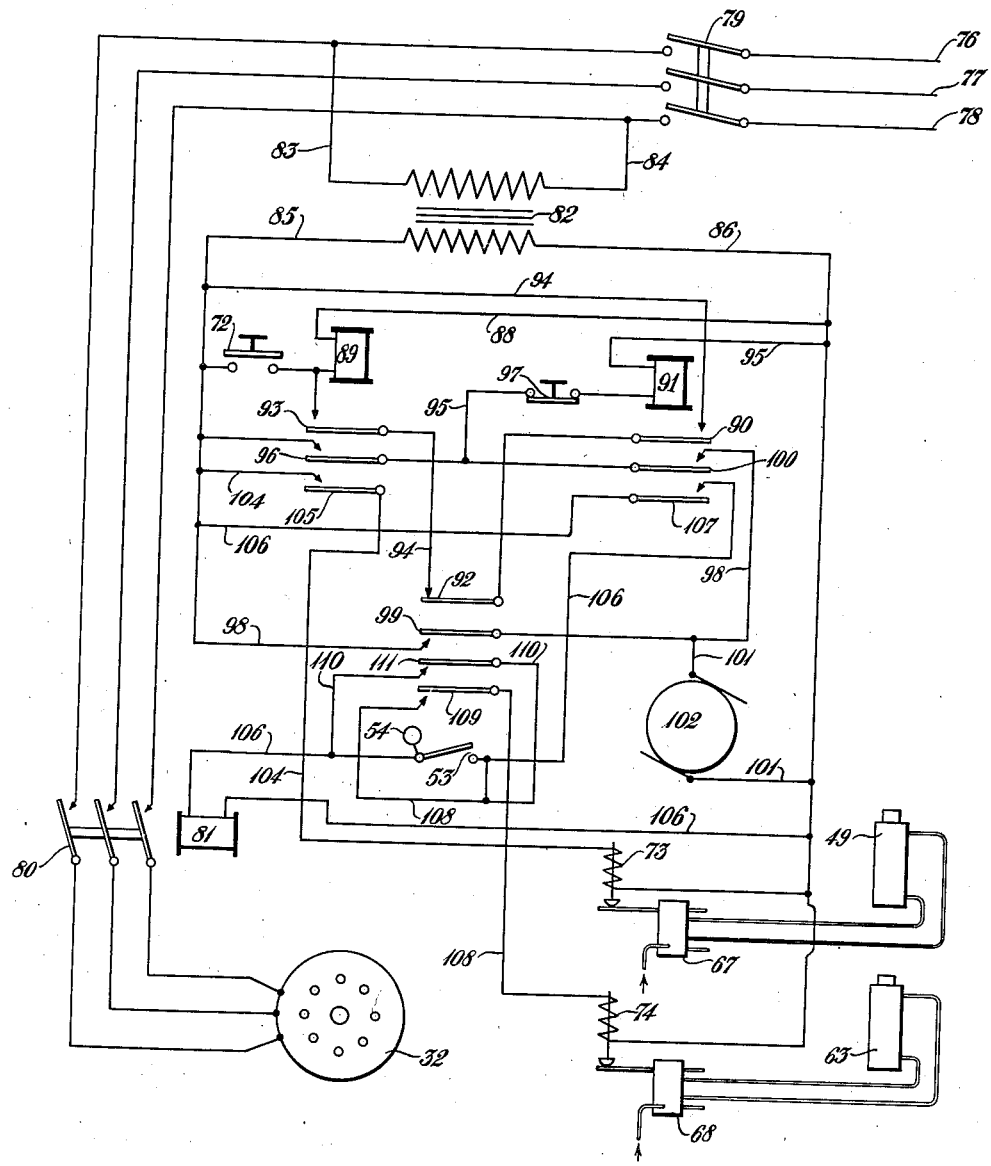

Patented Dec. 9, 1941

2,265,749

UNITED STATES PATENT OFFICE 2,265,749

PRESSING APPARATUS

Horace D. Stevens, Akron, Ohio, assignor to The Firestone Tire & Rubber Company, Akron, Ohio, a corporation of Ohio Application October 19, 1939, Serial No. 300,181

6 Claims. (Cl. 154—9)

This invention relates to pressing apparatus, and more especially it relates to apparatus for applying pressure progressively to a flexible endless structure longitudinally thereof.

The invention is of primary utility in the rubber industry for applying pressure to inner tubes for pneumatic tire casings, during the manufacture of the tubes. The inner tubes upon which the apparatus is used are of the "leak-proof" type that have their inner wall treated with a proofing composition to prevent the diffusion of air through their rubber structure. In the manufacture of such tubes the proofing composition, in thin viscous form, is placed within the tube before its ends are spliced to produce its endless form. After splicing, the tube is rolled or pressed progressively in a longitudinal direction to distribute the proofing composition evenly over the entire interior surface of the tube. It is for performing the aforesaid rolling operation that the present invention is provided.

The chief objects of the invention are to effect an even distribution of the proofing solution; to provide apparatus for rolling an inner tube for a definite time interval; to provide automatically for ejecting the completely rolled tube from the apparatus; to provide for conveying the ejected tube away from the apparatus; and to provide apparatus for applying pressure uniformly and evenly to all parts of the tube notwithstanding variations in the transverse thickness of the tube structure. Other objects will be manifest as the description proceeds.

Of the accompanying drawings:

Figure 3 is a front elevation, on a larger scale, of the work-engaging instrumentalities of the apparatus shown in Figure 1, and the work therein;

Figure 4 is a detail sectional side elevation of the work-engaging instrumentalities of the apparatus in the position they assume in ejecting the work from the apparatus;

Figure 5 is a section on the line 5—5 of Figure 3;

Figure 8 is a wiring and piping diagram of the apparatus.

Figure 1:
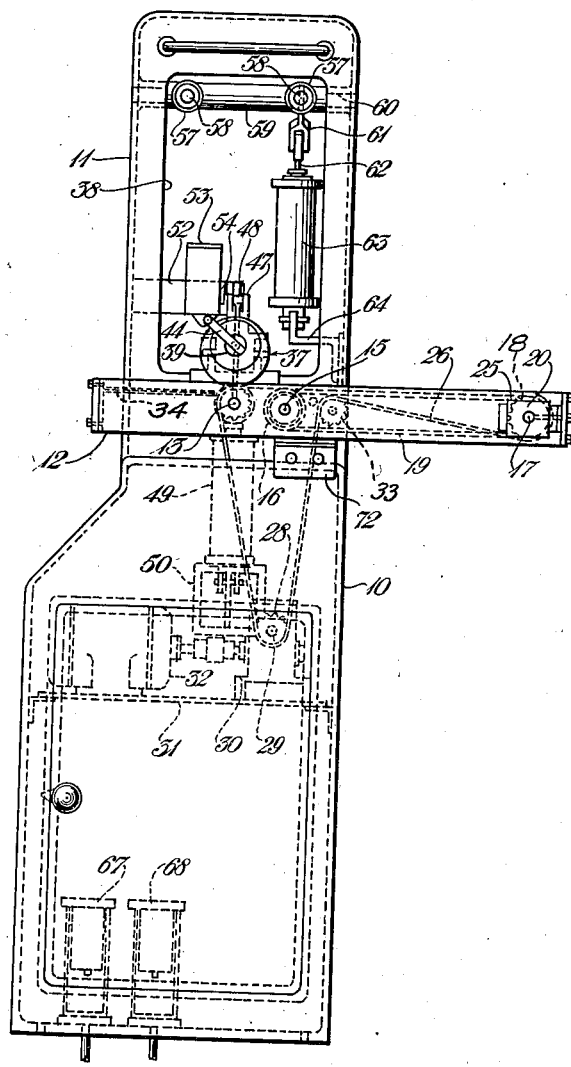
Figure 1 is a front elevation of apparatus embodying the invention, in operative position.

Referring to the drawings, there is shown a lower housing structure 10, and an upper housing structure 11 of somewhat smaller size superposed thereon. Mounted upon the front wall of the upper housing 11, and projecting forwardly and laterally therefrom is an overhanging frame 12 of rectangular shape. Journalled in the front and rear members of the frame 12 is a driven horizontal shaft 13, which shaft has a roller 14 fixed thereon, said shaft being disposed in the central fore-and-aft plane of the upper housing, the roller 14 constituting one of the presser rollers of the apparatus. Journalled in the frame 12, parallel to shaft 13 and a little to the right thereof as viewed from the front of the apparatus, is an idler shaft 15 upon which is mounted a plurality of axially spaced apart peripherally grooved sheaves 16, 16. At the extreme right end of the frame 12 is a driven shaft 17 upon which is mounted a plurality of sheaves 18, 18 that are in alignment with the sheaves 16 aforementioned, each pair of sheaves 16, 18 supporting an endless conveyor belt 19 of narrow width. The shaft 17 is journaled at its opposite ends in respective journal blocks 20 that are slidably mounted in the front and rear members of the frame 12, at the right hand end thereof. The blocks 20 are adjustable longitudinally of the frame through the medium of respective adjusting screws 21, the arrangement being such as to enable the belts 19 to be maintained at desired tautness.

Figure 6:
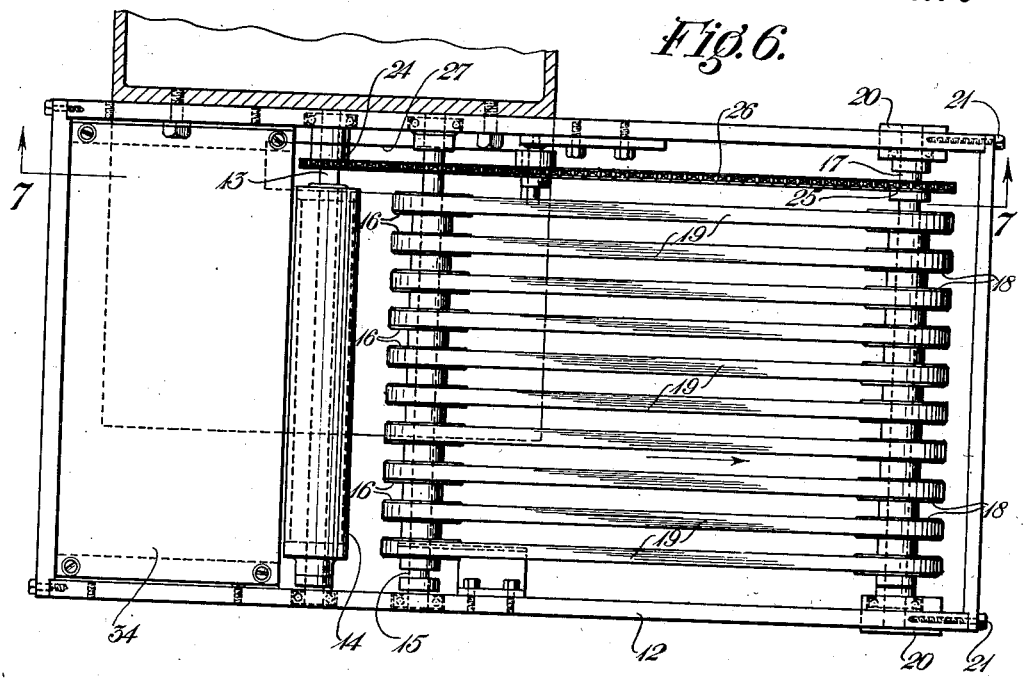
Figure 6 is a plan view of the apparatus, a part thereof being broken away.
Figure 7:
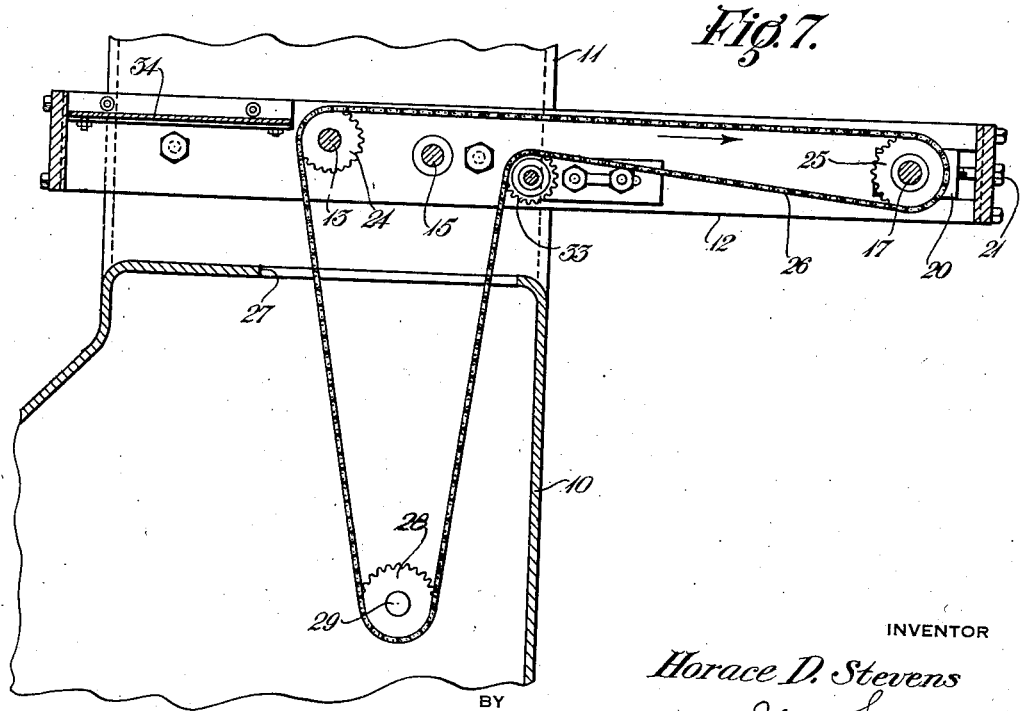
Figure 7 is a section on the line 7—7 of Figure 6.

Upon the end of shaft 13 nearest the upper housing 11 is mounted a sprocket 24, and a similar sprocket 25 is mounted upon the end of shaft 17. Trained about sprockets 24, 25 is a sprocket chain 26 for driving the same and the shafts 15, 17, the lower reach of said sprocket chain extending downwardly through an opening 27 in the top of lower housing 10 and being trained about a sprocket 28 on the shaft 29 of a reduction gear device 30. The lower reach of the chain 26 also is trained about an adjustable idler sprocket 33 by means of which the chain may be maintained in taut condition. The reduction gear device 30 is mounted upon a shelf-like support 31 within the housing 10, and is driven by a motor 32 that also is mounted upon support 31. The arrangement is such as to effect the concurrent driving of the roller 14 and the conveyor belts 19, the upper or work-receiving reaches of the latter moving in the direction indicated by the arrow in Figure 6 whereby work pieces deposited thereon will be conveyed to the right hand end of the apparatus and dropped off the end of frame 12. Any suitable conveying means (not shown) may be provided thereat for receiving the work pieces and for delivering them to any desired destination for additional fabrication. A tray 34 is supported by the frame 12 at the left of the driven roller 14.

Adapted to co-operate with the driven roller 14 for effecting the progressive pressing of the work is a presser roller that is designated as a whole by the numeral 37, and which commonly is known as a contour roller. This roller has a horizontal operative position over the roller 14 and parallel thereto, and has a vertical inoperative position, shown in Figure 4, in which it is positioned within the upper housing 11, the latter having a large opening 38 in its front wall that enables the roller to pass therethrough. Said contour roller comprises a central, non-rotatable bar or rod 39 that is mounted at one end in a bracket 40, the latter being pivotally mounted in a supporting bracket 41 that is mounted upon a ledge within the housing structure 11. The rod 39 carries end plates 42, 42 between which are mounted on the rod a plurality of discs or washers 43, 43, each of which has an axial aperture substantially larger than the rod so that the discs are capable of movement to eccentric positions relatively of the rod, as well as rotary movement about the rod. A guard member 44 supported at one end by an arm 45 secured to the free end of the rod 39 and at the other end by an arm 46 formed on bracket 40 is provided for limiting the eccentric positions of the discs in one direction. For swinging the contour roller between the operative and inoperative positions aforementioned, the bracket 40 is formed with a rearwardly extending lever arm 47 to the free end of which is pivotally connected the piston rod 48 of a double-acting fluid pressure operated cylinder 49, the latter being vertically disposed and pivotally mounted at its lower end upon a bracket 50 that is mounted in the lower housing 10, upon the rear wall thereof.

The construction of the contour roller 37 is such that when it is lowered upon a work piece, such as the endless, unvulcanized rubber tube structure 51, the roller will exert uniform pressure on the transverse region of the tube notwithstanding the irregular thickness of the flattened tube due to the folded margins thereof. This result is achieved by the feature of loose journaling of the discs 43 on the rod 39 which enables said discs to assume independent positions eccentrically of said rod. The pressure upon the tube consists solely of the weight of the discs 43, which press the tube against the driven roller 14 to feed the tube longitudinally, the cylinder 49 being used solely for raising and lowering the roller.

Mounted within the upper housing 11 upon a bracket 52 secured to a lateral wall thereof is an electric switch 53 having an operating lever 54 that projects into the arc of movement of the free end of lever arm 47. The arrangement is such that the lever 54 is raised when the contour roller 37 is in the operative position shown in Figures 1, 2, and 3 and lowered when the contour roller is in the inoperative position shown in Figure 4. When the lever 54 is raised the switch is closed and when said lever is lowered the switch is open. The function of the switch 53 in its relation to the operation of the apparatus presently will be explained.

Figure 2:
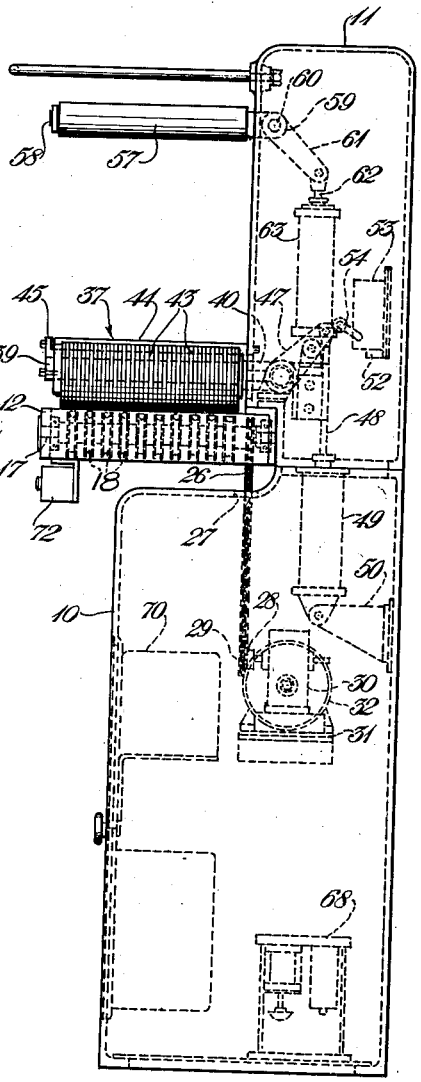
Figure 2 is a side elevation thereof, as viewed from the right of Figure 1.

For supporting the endless tube 51 in an open loop while it is being progressively pressed, as shown in Figure 3, a pair of idler supporting rollers 57, 57 are provided. Said rollers are in parallel, spaced apart relation, and have a horizontal operative position somewhat above the contour roller 37, as shown in Figures 1 to 3, and have a vertical inoperative position within the upper housing 11, as shown in Figure 4, the opening 38 in the front wall of the housing enabling the rollers to be moved thereinto. Each roller 57 is journaled upon an axial spindle 58 that is secured to and projects radially from a tubular bracket structure 59, the latter being pivotally mounted for angular movement upon an axial shaft 60 that is supported from its opposite ends, which ends are attached to the opposite lateral walls of the upper housing 11, interiorly thereof near its top. For swinging the idler rolls 57 between the operative and inoperative positions mentioned, the bracket 59 is formed integrally with a rearwardly extending lever arm 61, the free end of which is pivotally connected to the end of the piston rod 62 of a vertically disposed double-acting fluid pressure operated cylinder 63. The latter is pivotally mounted at its lower end upon a bracket 64 secured to a sidewall of the upper housing 11, interiorly thereof. The rollers 57 are so arranged that when in lowered, inoperative position they will be disposed on opposite sides of the contour roller 37 when the latter is in elevated inoperative position, as shown in Figure 4.

It will be understood that the fluid pressure operated cylinders 49 and 63 have the usual piping connections (not shown) that connect with their upper and lower ends and supply the fluid by means of which they are operated. Admission of fluid to one end of either cylinder while exhausting the fluid from the opposite end thereof is effected by means of a four-way solenoid operated valve, of which valve 67 controls the operation of cylinder 49 and valve 68 controls the operation of cylinder 63. The said valves are located in the bottom of lower housing 10 and are electrically operated by means of respective solenoids 73, 74, Fig. 8, connected therewith.

Various mechanisms of the apparatus are operated in determinate time sequence by means of an electrically driven timing device that is enclosed in a casing 70 mounted on the front wall of the lower housing 10, interiorly thereof. The said timing device is of well known construction and need not be illustrated and described in detail herein except as shown in the wiring diagram, Fig. 8.

Referring now to the said wiring diagram, it will be seen that motor 32 operates by electric current delivered thereto by conductors 76, 77, and 78 from any convenient source of electric power, said conductors including a three-pole, manually operable master switch 79, and a three pole relay controlled switch 80, the latter being controlled by a relay 81 as presently will be explained. The relay 81 and timing mechanism are located in a low voltage control circuit that is energized from the conductors 76, 78 of the main power line through the agency of a transformer 82, the latter being connected to conductors 76, 78 by connections 83, 84, respectively. The control circuit comprises main power leads 85, 86 that are connected to the output side of transformer 82.

Connecting conductors 85, 86 is a conductor 88 in which is mounted a control relay 89 and a manually operated normally open starting switch 72. Connecting conductor 85 with conductor 88, between switch 72 and relay 89, is a holding circuit 94 for relay 89, said holding circuit including a normally open switch 90 controlled by a relay 91 as presently will be explained, a normally closed timer switch 92 controlled by the timing mechanism, and a normally open switch 93 controlled by the relay 89.

Also connecting conductors 85, 86 is a conductor 95 in which is mounted a normally open switch 96 operated by relay 89, a normally closed manually operated "stop" switch 97, and the control relay 91. Connecting conductor 85 with conductor 95, between switches 96 and 97, is a holding circuit 98 for relay 91, said holding circuit including a normally open timer switch 99 controlled by the timing mechanism and a normally open switch 100 controlled by relay 91. Connecting conductor 86 with circuit 98, between switches 99, 100 of the latter, is a conductor 101 across which is mounted the motor 102 of the timing mechanism, the rotation of said motor serving to operate timer switches 92 and 99 previously described, and other switches presently to be described, in determinate time relation to each other.

Also connecting conductors 85, 86 is a conductor 104 in which is mounted a normally open switch 105 operated by the relay 89, and the solenoid 73 that operates four-way valve 67 that controls cylinder 49. Also connecting conductors 85, 86 is a circuit 106 that includes a normally open switch 107 controlled by relay 91, the switch 53 that is open in the inoperative condition of the apparatus, and the relay 81 aforementioned. Connecting conductor 86 with circuit 106, between switches 107, 53 in the latter, is a circuit 108 that includes a normally open timer switch 109 under control of the timing mechanism, and the solenoid 74 that operates four-way valve 68 that controls cylinder 63. A holding circuit 110 for the relay 81 connects circuit 108 to conductor 106, between switch 53 and relay 81 of the latter, and includes a normally open timer switch 111 that is controlled by the timing mechanism.

The operation of the apparatus is as follows: In the inoperative position of the apparatus the motor 32 is idle, although the master switch 79 is closed, the idler rollers 57 are in horizontal position, and the contour roller 37 is in elevated vertical position, the lever 54 of switch 53 thereby being depressed so that the switch is in open position. With the elements of the apparatus in the positions stated, the operator mounts the endless rubber tube 51 upon the idler rollers 57, the lower portion of the tube resting upon the driving roller 14. As soon as the work is properly positioned, the operator presses the starting switch 72 with the result that relay 89 is energized and operates to close switches 93, 96 and 105. Closing of switch 96 closes the circuit 95 of relay 91 whereby the latter is energized and closes switches 90, 100 and 107. Closing of switches 90, 93 energizes the holding circuit 94 and relay 89 continues to function after the starting switch 72 is released and opens. Closing of switches 96, 100 energizes the motor 102 through the agency of conductors 95, 98 and 101 and starts operation of the timing mechanism, and concurrently therewith the closing of switch 105 energizes solenoid 73, the operation of which reverses valve 67 to effect the charging of the lower end of cylinder 49 and thus to lower the contour roll 37. The latter operation effects the lifting of switch lever 54 and the closing of switch 53, with the result that circuit 106 is energized to operate relay 81, and operation of the latter closes the three-pole switch 80 to set the motor 32 in operation.

Driving of the motor 32 causes the upper reach of the conveyor belts 19 to move in the direction that is away from roller 14, and drives the latter in clockwise direction as viewed from the front of the apparatus. Due to the pressure of the contour roller 37 on the tube 51, the latter is pressed into frictional driving engagement with the driven roll 14 and impelled longitudinally by the latter. The pressure of the roller 37 also flattens the tube 51 transversely thereof, and thus forces the viscous sealing composition in the tube to be spread over the inner surface thereof, progressively about the entire tube. This phase of operation continues until every part of the tube has passed between the rollers 14, 37 at least twice.

In the next phase of operation the timing mechanism opens switch 92 and closes switch 99 with the result that the holding circuit 94 of relay 89 is opened and the latter deenergized, thereby opening switches 93, 96 and 105. Concurrently with the opening of switch 92, the timing mechanism closes switch 99 so that circuit 101 has connection with conductor 85 through said switch 99 and circuit 98 becomes a holding circuit for relay 91. Opening of switch 105 in circuit 104 de-energizes solenoid 73 and the latter functions to reverse valve 67 and thereby to charge the upper end of cylinder 49 while discharging the lower end thereof. This moves the piston rod 48 downwardly and consequently lifts the contour roll 37 to the vertical position shown in Fig. 4. Descent of piston rod 48 effects the lowering of switch lever 54 to open switch 53, but before this occurs the timing mechanism closes switch 111, whereby circuit 110 becomes a holding circuit for relay 81. The timing mechanism next closes switch 109 and thereby energizes solenoid 74, the latter then functioning to reverse valve 68 to effect the charging of the lower end of cylinder 63 and the concurrent discharging of the upper end thereof to move the idler rollers 57 to the vertical position shown in Fig. 4. This causes the work unit 51 to drop onto the rotating drive roller 14 and conveyor belts 19, the latter conveying the work to the far end of frame 12 where it drops from the apparatus.

The timing mechanism may then close switch 92 to restore it to original position, and then opens switches 109 and 111. Opening of switch 109 de-energizes solenoid 74 and thereby reverses valve 68 to charge the upper end of cylinder 63 and discharge the lower end thereof to move the idler rollers 57 again to horizontal position. Opening of switch 111 de-energizes relay 81, thereby causing the latter to open switch 80 and thus to stop the motor 32. Lastly the timing mechanism opens switch 99, thereby de-energizing relay 91 and causing the latter to open switches 90, 100 and 107, and also opening circuit 101 so that the motor 102 of the timing mechanism is brought to rest. This completes a cycle of operation, which may be repeated as often as desired and as rapidly as the operator can mount unfinished work units in place. It will be observed that operation of the apparatus may be stopped at any time by the opening of stop switch 97.

The invention is substantially fully automatic in its operation, thus conserving time and labor. The invention results in the uniform distribution of viscous composition throughout the interior of the work, and achieves the other objects set out in the foregoing statement of objects.

Modification may be resorted to without departing from the spirit of the invention, or the scope thereof as defined by the appended claims.

What is claimed is:

1. In pressing apparatus of the character described, the combination of a presser roller, a pair of idler rollers adapted to support an endless unit of work in an open loop with the presser roller disposed therein, means for feeding the work unit longitudinally to effect the progressive pressing thereof by the presser roller, and means for withdrawing the presser roller and idler rollers from the plane of the work unit at the termination of the pressing operation.

2. In pressing apparatus of the character described, the combination of a presser roller, a pair of idler rollers adapted to support an endless unit of work in an open loop disposed in a vertical plane with the presser roller positionable within said loop, a driven feed roller positioned in opposition to said presser roller adapted to feed the work unit longitudinally to effect the progressive pressing thereof, and means for withdrawing the presser roller and the idler rollers from the plane of the work unit at the termination of the pressing operation.

3. In pressing apparatus of the character described, the combination of a presser roller, a pair of idler rollers adapted to support an endless unit of work in an open loop disposed in a vertical plane with the presser roller positionable within said loop, pivotal supports for said rollers, means for feeding the work unit longitudinally to effect progressive pressing thereof by the presser roller, and means for swinging said rollers angularly about their pivots to withdraw them from the plane of the work unit at the completion of the pressing operation.

4. In pressing apparatus of the character described, the combination of a presser roller, a pair of idler rollers adapted to support an endless work unit in an open loop in a vertical plane with the presser roller at the bottom of the loop, pivotal mountings for said rollers, means for feeding the work unit longitudinally to effect progressive pressing thereof by the presser roller, and means for swinging the presser roller upwardly and the idler rollers downwardly, in timed relation to each other, to withdraw them from engagement with the work at the completion of the pressing operation.

5. In pressing apparatus of the character described, the combination of a presser roller, a pair of idler rollers adapted to support an endless work unit in an open loop in a vertical plane with the presser roller at the bottom of the loop, pivotal mountings for said rollers, a driven feed roller positioned in opposition to said presser roller adapted to feed the work longitudinally to effect the progressive pressing thereof, a work conveyor extending laterally away from said feed roller for removing finished work, means common to the feed roller and conveyor for driving the same, and means for pivotally swinging the presser roller and idler rollers to withdraw them from the plane of the work unit and thus to cause the latter to fall onto the conveyor.

6. In pressing apparatus of the character described, the combination of a horizontally disposed driven feed roller, a conveyor extending laterally away from said roller, a presser roller movable between a horizontal position in opposition to said feed roller to exert pressure on work therebetween, and a vertical inoperative position, a pair of idler rollers movable as a unit between a horizontal operative position and a vertical inoperative position, said idler rollers adapted to support an endless work unit in an open loop in a vertical plane with the presser roller in the bottom of the loop, and means for effecting cyclic operation of said mechanisms including moving of the presser roller to horizontal position to engage a work unit suspended from the horizontal guide rollers, driving of the feed roller and conveyor for a determinate time interval, moving of the presser roller and idler rollers to vertical position after a determinate time interval to cause the work unit to fall onto the conveyor, and subsequently restoring the idler rollers to horizontal position substantially concurrently with the stopping of the drive of the feed roller and conveyor.

HORACE D. STEVENS.